(12) United States Patent
Kim (10) Patent No.: US 10,079,022 B2
(45) Date of Patent: Sep. 18, 2018

(54) VOICE RECOGNITION TERMINAL, VOICE RECOGNITION SERVER, AND VOICE RECOGNITION METHOD FOR PERFORMING PERSONALIZED VOICE RECOGNITION

(71) Applicant: ELECTRONICS AND TELECOMMUNICATIONS RESEARCH INSTITUTE, Daejeon (KR)

(72) Inventor: Dong-Hyun Kim, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/193,216

(22) Filed: Jun. 27, 2016

(65) Prior Publication Data

US 2017/0194002 A1    Jul. 6, 2017

(30) Foreign Application Priority Data

Jan. 5, 2016    (KR) .......................... 10-2016-0000869

(51) Int. Cl.
*G01L 15/00*    (2006.01)
*G10L 15/04*    (2013.01)
(Continued)

(52) U.S. Cl.
CPC .............. *G10L 15/30* (2013.01); *G10L 15/02* (2013.01); *G10L 15/183* (2013.01)

(58) Field of Classification Search
CPC ... G10L 15/063; G10L 15/142; G10L 15/187; G10L 15/144; G10L 15/08; G10L 15/22;
(Continued)

(56) References Cited

U.S. PATENT DOCUMENTS 5,937,384 A * 8/1999 Huang ................. G06K 9/6297
                                                       704/251
6,668,243 B1 * 12/2003 Odell ...................... G10L 15/08
                                                       704/242
(Continued)

FOREIGN PATENT DOCUMENTS

JP         2012-063537 A      3/2012
KR    10-2008-0023030 A      3/2008
(Continued)

OTHER PUBLICATIONS

Speaker adaptation of context dependent deep neural networks H Liao—Acoustics, Speech and Signal Processing (ICASSP) . . . , 2013—ieeexplore.ieee.org.*

(Continued)

*Primary Examiner* — Anne L Thomas-Homescu
(74) *Attorney, Agent, or Firm* — LRK Patent Law Firm (57) ABSTRACT

A voice recognition terminal, a voice recognition server, and a voice recognition method for performing personalized voice recognition. The voice recognition terminal includes a feature extraction unit for extracting feature data from an input voice signal, an acoustic score calculation unit for calculating acoustic model scores using the feature data, and a communication unit for transmitting the acoustic model scores and state information to a voice recognition server in units of one or more frames, and receiving transcription data from the voice recognition server, wherein the transcription data is recognized using a calculated path of a language network when the voice recognition server calculates the path of the language network using the acoustic model scores.

7 Claims, 6 Drawing Sheets

(51) Int. Cl.
*G10L 15/14* (2006.01)
*G10L 15/26* (2006.01)
*G10L 15/28* (2013.01)
*G10L 15/18* (2013.01)
*G10L 15/20* (2006.01)
*G10L 17/00* (2013.01)
*G10L 15/30* (2013.01)
*G10L 15/02* (2006.01)
*G10L 15/183* (2013.01)

(58) Field of Classification Search
CPC ....... G10L 15/20; G10L 15/02; G10L 15/265; G10L 15/10; F10L 17/005; H05K 999/99; G06F 17/2785
See application file for complete search history.

(56) References Cited

U.S. PATENT DOCUMENTS

| | | | | |
|---|---|---|---|---|
| 7,720,683 B1* | 5/2010 | Vermeulen | | G10L 15/22 704/235 |
| 8,370,130 B2* | 2/2013 | Yun | | G06F 17/2755 704/10 |
| 9,449,598 B1* | 9/2016 | Rastrow | | G10L 15/32 |
| 9,620,108 B2* | 4/2017 | Sak | | G10L 15/08 |
| 2002/0135618 A1* | 9/2002 | Maes | | G06F 3/0481 715/767 |
| 2005/0010412 A1* | 1/2005 | Aronowitz | | G10L 15/02 704/254 |
| 2006/0178886 A1* | 8/2006 | Braho | | G10L 15/065 704/246 |
| 2007/0192104 A1* | 8/2007 | Blewett | | G10L 15/28 704/256 |
| 2007/0299666 A1* | 12/2007 | Li | | G10L 15/005 704/236 |
| 2008/0065380 A1* | 3/2008 | Kwak | | G10L 17/04 704/243 |
| 2008/0114595 A1* | 5/2008 | Vair | | G10L 15/08 704/236 |
| 2008/0201147 A1* | 8/2008 | Han | | G10L 15/30 704/254 |
| 2010/0169090 A1* | 7/2010 | Cui | | G10L 15/20 704/233 |
| 2011/0054883 A1* | 3/2011 | Yun | | G06F 17/2755 704/9 |
| 2011/0131046 A1* | 6/2011 | Zweig | | G10L 15/02 704/251 |
| 2011/0166855 A1* | 7/2011 | Vermeulen | | G10L 15/32 704/231 |
| 2011/0301953 A1* | 12/2011 | Lee | | G10L 15/187 704/243 |
| 2012/0041764 A1* | 2/2012 | Xu | | G10L 15/065 704/256.1 |
| 2012/0109650 A1* | 5/2012 | Cho | | G10L 15/144 704/238 |
| 2012/0166183 A1* | 6/2012 | Suendermann | | G06F 17/30654 704/9 |
| 2013/0325473 A1* | 12/2013 | Larcher | | G10L 17/10 704/249 |
| 2014/0129224 A1* | 5/2014 | Chien | | G10L 15/142 704/249 |
| 2015/0006175 A1* | 1/2015 | Park | | G10L 15/18 704/245 |
| 2015/0081606 A1* | 3/2015 | Zhao | | G06N 3/08 706/25 |
| 2015/0095032 A1* | 4/2015 | Li | | G10L 15/083 704/255 |
| 2015/0161991 A1* | 6/2015 | Sak | | G10L 15/08 704/254 |
| 2016/0093297 A1* | 3/2016 | Deisher | | G10L 15/285 704/236 |
| 2016/0098986 A1* | 4/2016 | Hofer | | G10L 15/083 704/243 |
| 2016/0267380 A1* | 9/2016 | Gemello | | G06N 3/084 |
| 2016/0300566 A1* | 10/2016 | Hofer | | G10L 15/08 |
| 2016/0351188 A1* | 12/2016 | Rao | | G10L 15/063 |
| 2016/0372119 A1* | 12/2016 | Sak | | G10L 17/14 |
| 2016/0379624 A1* | 12/2016 | Fujimura | | G10L 15/183 704/235 |
| 2016/0379629 A1* | 12/2016 | Hofer | | G06F 17/277 704/257 |
| 2017/0053652 A1* | 2/2017 | Choi | | G10L 15/32 |
| 2017/0148444 A1* | 5/2017 | Bocklet | | G10L 17/22 |
| 2017/0186420 A1* | 6/2017 | Sak | | G10L 15/16 |
| 2017/0220929 A1* | 8/2017 | Rozen | | G06N 3/08 |
| 2017/0337918 A1* | 11/2017 | Xue | | G06N 3/084 |

FOREIGN PATENT DOCUMENTS

| | | |
|---|---|---|
| KR | 10-2008-0077873 A | 8/2008 |
| KR | 10-2011-0133739 A | 12/2011 |

OTHER PUBLICATIONS

Towards end-to-end speech recognition with recurrent neural networks A Graves, N. Jaitly—Proceedings of the 31st International Conference on . . . , 2014—jmlr.org.*
Phone recognition with the mean-covariance restricted Boltzmann machine G Dahl, A Mohamed, GE Hinton—Advances in neural information . . . , 2010—papers.nips.cc.*
Towards knowledge-based features for HMM based large vocabulary automatic speech recognition B Launay, O Siohan, A Surendran . . . —Acoustics, Speech, and . . . , 2002—ieeexplore. ieee.org.*
On the training aspects of deep neural network (DNN) for parametric TTS synthesis Y Qian, Y Fan, W Hu, FK Soong—Acoustics, Speech and Signal . . . , 2014—ieeexplore.ieee.org.*
Statistical Parametric Speech Synthesis Using Deep Neural Networks https://research.google.com/pubs/pub40837.html by H Zen—2013.*
Probabilistic Classification of HMM States for Large Vocabulary Continuous Speech Recognition ieeexplore.ieee.org/iel4/6110/16347/00758135.pdf by X Luo—1999.*
Tree-based state tying for high accuracy acoustic modelling dl.acm.org/citation.cfm?id=1075885 by SJ Young—1994.*
Hinton et al., "Deep Neural Networks for Acoustic Modeling in Speech Recognition", Oct. 15, 2012.*
Dahl et al., "Phone Recognition with the Mean-Covariance Restricted Boltzmann Machine", Dec. 6, 2010.*
Context-Dependent Pre-Trained Deep Neural Networks for Large-Vocabulary Speech Recognition ieeexplore.ieee.org/document/5740583/ by Ge Dahl—2012.*

* cited by examiner

VOICE RECOGNITION TERMINAL, VOICE RECOGNITION SERVER, AND VOICE RECOGNITION METHOD FOR PERFORMING PERSONALIZED VOICE RECOGNITION

CROSS REFERENCE TO RELATED APPLICATION

This application claims the benefit of Korean Patent Application No. 10-2016-0000869, filed Jan. 5, 2016, which is hereby incorporated by reference in its entirety into this application.

BACKGROUND OF THE INVENTION

1. Technical Field

The present invention generally relates to voice recognition and, more particularly, to technology related to a voice recognition terminal including an acoustic model, a server for performing voice recognition, and a voice recognition method using the voice recognition terminal.

2. Description of the Related Art

Generally, voice recognition (or speech recognition) refers to technology for interpreting voice signals and combining the voice signals with patterned data stored in a database (DB), thus converting the voice signals into character strings or identifying linguistic semantic relationships. Voice recognition is performed in units of characters. Alternatively, when there are various relationships between the spelling and, pronunciation of characters, voice recognition must be performed in units of at least words.

When the word or a sentence on which voice recognition is to be performed is set in advance and only the set word or sentence is provided to a voice recognition device, voice recognition is relatively simply performed. However, technology for performing voice recognition on normal sentences or conversation requires relatively high technical skills due to the ambiguity and variety of natural language.

Voice recognition technology is configured such that a voice recognition device analyzes an input voice signal, extracts features from the voice signal, measures similarities between the input voice signal and previously collected voice models stored in a voice model DB, and converts the voice model most similar to the input voice signal into characters or instructions. Voice recognition technology is a kind of pattern recognition procedure, and tones, pronunciation and accents differ from each other between, persons. Thus, conventional voice recognition technology collects voice data from as many people as possible, extracts common characteristics from the voice data, and then generates reference patterns.

Voice recognition technologies based on speakers to be recognized may be classified into a speaker-independent recognition method, a speaker-adaptive recognition method, and a speaker-dependent recognition method. First, the speaker-independent recognition method enables the speech of any speaker to be recognized, and is configured to extract information in advance about the voices of various speakers and arrange the extracted information in a DB, thus being usable without requiring, a separate training procedure. Further, the speaker-adaptive recognition method adapts a speaker-independent recognition device to a user's voice in order for the user to improve the rate of recognition of his or her voice.

Furthermore, the speaker-dependent recognition method requires a procedure that allows a specific speaker or user to train a recognition device with his or her voice. The voice recognition device to which the speaker-dependent recognition method is applied can recognize only voices for which it has been trained. Since the speaker-dependent recognition method is implemented relatively simply, it has been installed in and applied to various types of terminals, but it is inconvenient in that the user must, undergo a training procedure.

Recently, research into technology for incorporating personalized characteristics into conventional voice recognition methods has been conducted. When a voice recognition system is implemented in the form of a terminal, a personalization task such as adaptation to speakers may be performed in conformity with respective personalized terminals. However, there is a disadvantage in that it is difficult to implement a voice recognition device for accommodating a large-vocabulary language model. Meanwhile, an online voice recognition method involving communication with a voice recognition server can accommodate a large-vocabulary language model, but there is the burden of separately storing personalized information in a voice recognition server.

Thus, as voice recognition technology for reflecting personalized characteristics while reducing the burden of storage on a server, technology in which a voice recognizer for high-frequency vocabulary is installed in a terminal has been developed. Further, technology for allowing a terminal to perform phoneme recognition and transmit recognized phonemes to a server and for allowing the server to perform voice recognition has been proposed. This technology is advantageous in that speaker adaptation can be performed via the voice recognition method, but is disadvantageous in that two voice recognition systems including a language network must be provided in the terminal and the server, respectively, and there is a procedural restriction in that two-stage voice recognition must be performed by the terminal and the server.

Therefore, there is required technology in which both the terminal and, the server, which perform voice recognition, share their roles with each other, thus simplifying the voice recognition procedure while supporting personalized voice recognition.

In connection with this, Korean Patent Application Publication No. 10-2011-0133739 discloses a technology related to "System and, method of Multi model adaptive and voice recognition."

SUMMARY OF THE INVENTION

Accordingly, the present invention has been made keeping in mind the above problems occurring in the prior art, and an object of the present invention is to provide voice recognition technology, which reflects the personalized characteristics of respective speakers who have voice recognition terminals.

Another object of the present invention is to allow a voice recognition server to perform voice recognition that reflects personalized characteristics without having a separate DB or storage space for storing the personalized characteristics of speakers.

A further object of the present invention is to protect the personal information of each user who has a voice recognition terminal because there is no need to transmit personal information, such as the voice data of the user, which is required to reflect personalized characteristics, to a server.

Yet another object of the present invention is to effectively reduce the computational load on a voice recognition server because most calculations are performed using acoustic model scores that are stored in a voice recognition terminal.

In accordance with an aspect of the present invention to accomplish the above objects, there is provided a voice recognition terminal, including, a feature extraction unit for extracting feature data from an input voice signal, an acoustic score calculation unit for calculating acoustic model scores using the feature data, and a communication unit for transmitting the acoustic model scores and state information to a voice recognition server in units of one or more frames, and receiving transcription data from the voice recognition server, wherein the transcription data is recognized using, a calculated path of a language network when the voice recognition server calculates the path of the language network using the acoustic model scores.

The voice recognition terminal may further include a data selection unit for selecting acoustic model scores to be transmitted to the voice recognition server.

The data selection unit may select only n-best candidates from among the calculated acoustic model scores.

The data selection unit may select acoustic model scores corresponding to candidate information, received from the voice recognition server, from among the calculated acoustic model scores.

The data selection unit may select n-best state scores of, a last hidden layer from among the calculated acoustic model scores.

The voice recognition terminal may further include a storage unit for matching the extracted feature data with the transcription data received from the voice recognition server, and storing a result of matching as adaptation data.

The voice recognition terminal may further include an acoustic model adaptation unit for performing adaptation of an acoustic model using the stored adaptation data.

The acoustic model adaptation unit may perform the adaptation of the acoustic model during a time corresponding to any one of a preset time, a time during which the voice signal is not input, and a time during which communication with the voice recognition server is not performed.

The acoustic model scores may be represented in a fixed point format, and the state information may be represented by a binary value.

In accordance with another aspect of the present invention to accomplish the above objects, there is, provided a voice recognition server, including a reception unit for receiving, from a voice recognition terminal that extracts feature data from a voice signal and calculates acoustic model scores, both state information and the acoustic model scores that are clustered into units of one or more frames, a voice recognition unit for generating transcription data by applying the received acoustic model scores to a large-capacity language network, and a transmission unit for transmitting the transcription data, generated as a result of voice recognition, to the voice recognition terminal.

The reception unit may receive state information, required for calculation of scores of a higher token, from the voice recognition terminal.

The voice recognition unit, may calculate a final acoustic model score by applying n-best state scores of a last hidden layer, received from the voice recognition terminal, to a model corresponding to a final output layer, and perform voice recognition using the calculated final acoustic model score.

In accordance with a further aspect of the present invention to accomplish, the above objects, there is provided a voice recognition method using a voice recognition terminal, including extracting feature data from an input voice signal, calculating acoustic model scores using the extracted feature data, transmitting the acoustic model scores and state information to a voice recognition server in units of one or more frames, and receiving transcription data from the voice recognition server, wherein the transcription data is recognized using a calculated path of a language network when the voice recognition server calculates the path of the language network using the acoustic model scores.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Figure 1:
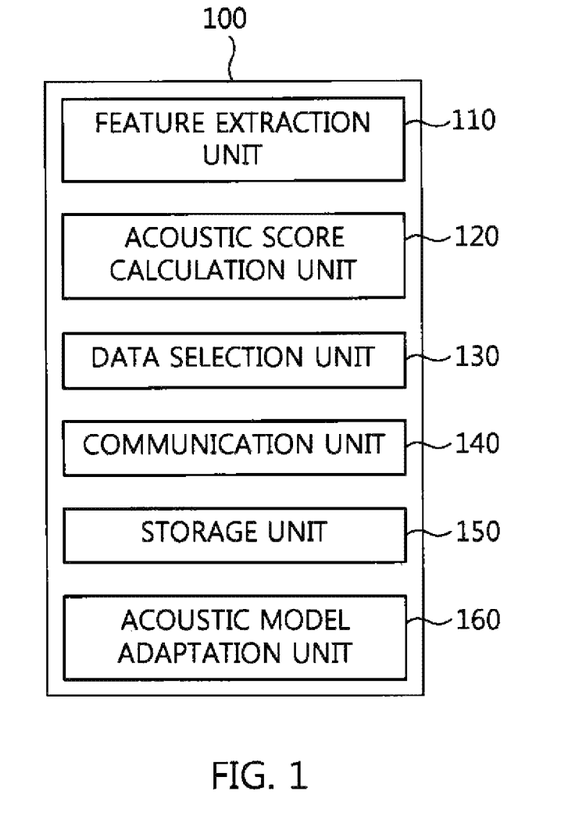
FIG. 1 is a block diagram showing the configuration of a voice recognition terminal according to an embodiment of the present invention.

FIG. 1 is a block diagram showing the configuration of a voice recognition terminal according to an embodiment of the present invention.

As shown in FIG. 1, a voice recognition terminal 100 includes a feature extraction unit 110, an acoustic score calculation unit 120, a data selection unit 130, a communication unit 140, a storage unit 150, and an acoustic model adaptation unit 160.

First, the feature extraction unit 110 extracts feature data from an input voice signal and converts the extracted feature data into a vector sequence. Here, the feature extraction unit 110 may extract features for each frame of the input voice signal.

Further, the feature extraction unit 110 may extract a recognition section, which is the target of voice recognition, before extracting the feature data, and may perform preprocessing for process noise.

The acoustic score calculation unit 120 calculates acoustic model scores using the extracted feature data. Here, the acoustic model scores may be represented in a fixed point format, and the acoustic score calculation unit 120 may calculate n-best state scores.

Figure 2:
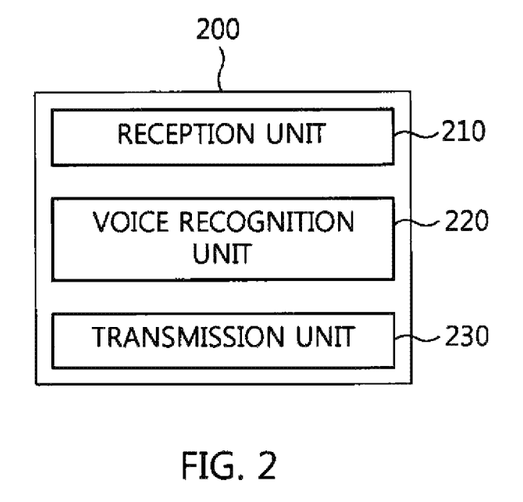
FIG. 2 is a block diagram showing the configuration of a voice recognition server according to an embodiment of the present invention.

The data selection unit 130 selects n-best state scores to be transmitted to a voice recognition server 200 (see FIG. 2). The data selection unit 130 may select the data to be transmitted to the voice recognition server 200 so as to reduce the amount of data that is transmitted from the voice recognition terminal 100 to the voice recognition server 200.

Here, the data selection unit 130 may select only n-best, candidates from among the calculated acoustic model scores. The number of candidates corresponding to output states which are transcription values identical to actual acoustic data is small, and remaining states are less related to the acoustic data. Therefore, the data selection unit 130 may select only n-best candidates from among the acoustic model scores as the acoustic model scores to be transmitted to the voice recognition server 200.

Further, the data selection unit 130 may select acoustic model scores corresponding to candidate information received from the voice recognition server 200 from among the calculated acoustic model scores.

When performing a calculation for searching for an optimal path by executing a token-passing algorithm or the like, the voice recognition server 200 transmits information about states corresponding to a higher score token in accumulated paths to the voice recognition terminal 100. Further, the voice recognition terminal 100 may transmit only the scores corresponding to the received state information to the voice recognition server 200.

Then, the data selection unit 130 may select the n-best state scores of the last hidden layer from among the calculated acoustic model scores.

The voice recognition terminal 100 may include only hidden layers up to the last hidden layer of an acoustic model, and the model corresponding to the final output layer may be included in the voice recognition server 200. In this case, the voice recognition terminal 100 may transmit n-best state values of the last hidden layer to the voice recognition server 200, and the voice recognition server 200 may obtain the final acoustic model score by calculating the state values of the final output layer using the received values.

Also, the communication unit 140 transmits the n-best state scores and information about the states to the voice recognition server 200 in units of one or more frames. The state information may be represented by binary values, which may be selected by the data selection unit 130.

Further, the communication unit 140 receives transcription data from the voice recognition server 200. Here, the transcription data is recognized using a calculated language network path when the voice recognition server 200 calculates a language network path using the acoustic model scores.

Next, the storage unit 150 may match the extracted feature data with, the transcription data received from the voice recognition server 200, and may store the result of the matching as adaptation data.

Further, the acoustic model adaptation unit 160 may perform the adaptation of the acoustic model using the stored adaptation data.

In this regard, the acoustic model adaptation unit 160 may perform the adaptation of the acoustic model during a remaining time corresponding to any one of a preset time, the time during which a voice signal is not input, and the time during which communication with the voice recognition server 200 is not performed.

FIG. 2 is a block diagram showing the configuration of the voice recognition server according to an embodiment of the present invention.

The voice recognition server 200 includes a reception unit 210, a voice recognition unit 220, and a transmission unit 230.

First, the reception unit 210 receives n-best state scores and state information, which are clustered into units of one or more frames, from the voice recognition terminal 100. The reception unit 210 may receive state information required to calculate the scores of a higher token from the voice recognition terminal 100.

The voice recognition unit 220 generates transcription data by applying acoustic model scores to a large-capacity language network.

Further, the voice recognition unit 220 may calculate the final acoustic model score by applying the n-best, state scores of a last hidden layer received from the voice recognition terminal 100 to the model corresponding to the final output layer. Furthermore, voice recognition may be performed using the calculated final acoustic model score.

Finally, the transmission unit 230 transmits the transcription data, generated as the result of voice recognition, to the voice recognition terminal 100.

Hereinafter, a voice recognition method using the voice recognition terminal according to an embodiment of the present invention will be described in greater detail with reference to FIGS. 3 to 6.

Figure 3:
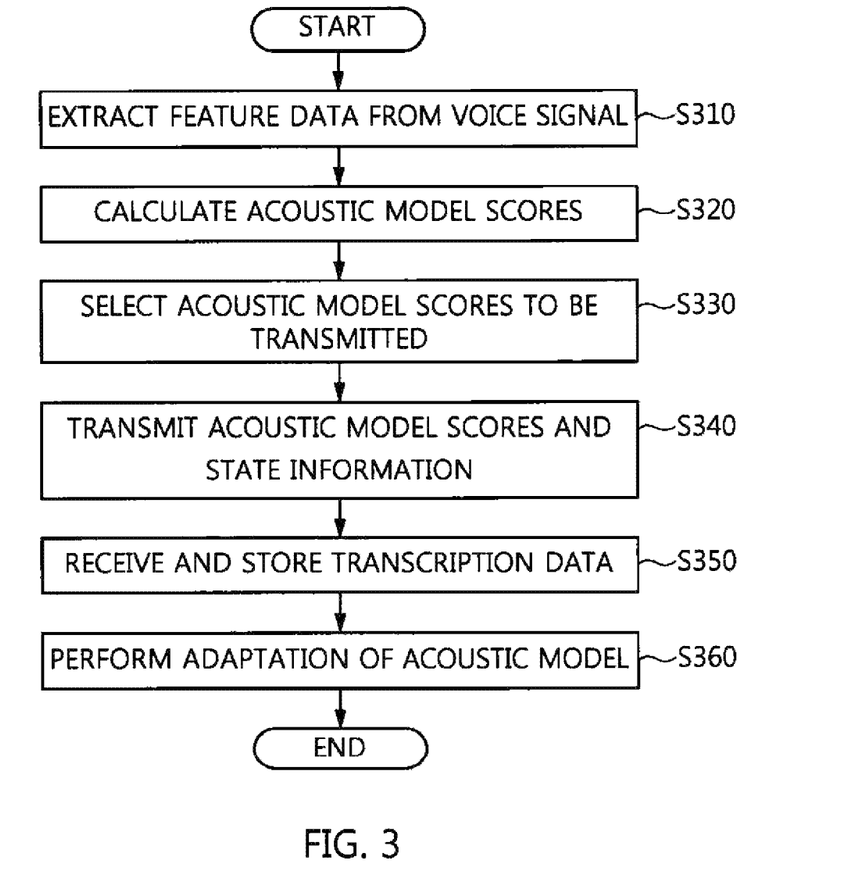
FIG. 3 is an operation flowchart showing a voice recognition method using the voice recognition terminal according to an embodiment of the present invention.
Figure 4:
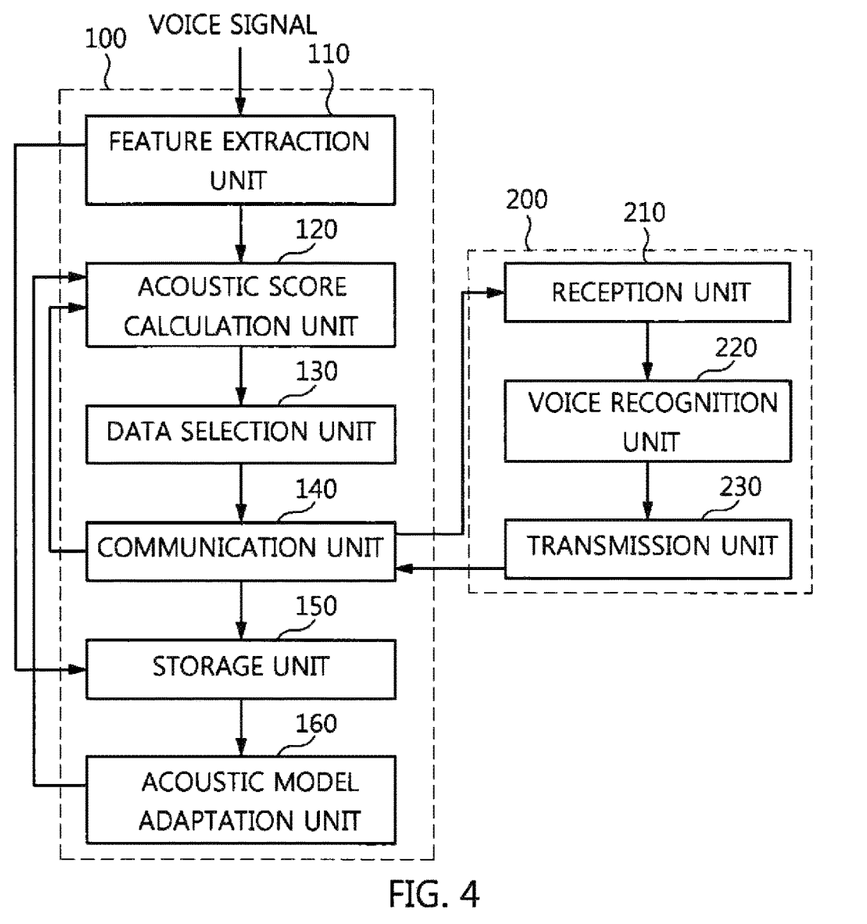
FIG. 4 is a diagram showing the data flows of the voice recognition terminal and the voice recognition server according to an embodiment of the present invention.

FIG. 3 is an operation flowchart showing a voice recognition method using the voice recognition terminal according to an embodiment of the present invention, and FIG. 4 is a diagram showing the data flows of the voice recognition terminal and the voice recognition server according to an embodiment of the present invention.

First, the voice recognition terminal 100 extracts feature data from an input voice signal at step S310. Further, the voice recognition terminal 100 converts the extracted feature data into a vector sequence.

Here, the voice recognition terminal 100 may extract the features for each frame of the input voice signal.

Also, the voice recognition terminal 100 calculates acoustic model scores using the extracted feature data at step S320. Here, the acoustic model scores denote n-best state scores, which may be represented in a fixed point format.

Here, the voice recognition terminal 100 may represent an acoustic model using a Deep Neural Network (DNN). In the voice recognition apparatus using a DNN, most calculations are used to measure DNN scores, and thus the voice recognition terminal 100 according to the embodiment of the present invention may reduce the burden on the voice recognition server 200 because calculation is performed in the voice recognition terminal 100 rather than in the voice recognition server 200.

The calculated acoustic model scores may be transmitted to the voice recognition server 200, which is synchronized with the voice recognition terminal 100 either in real time or at preset periods. Further, the voice recognition server 200 may select an optimal word sequence by applying the received acoustic model scores to a search for a language network path, and may transmit the result of voice recognition, including the selected word sequence, to the voice recognition terminal 100.

The voice recognition terminal 100 selects acoustic model scores to be transmitted to the voice recognition server 200 at step S330.

The voice recognition terminal 100 according to the embodiment of the present invention may select data to be transmitted to the voice recognition server 200 so as to reduce the amount of data to be transmitted to the voice recognition server 200. In this case, the voice recognition terminal 100 may calculate acoustic model scores using an acoustic model, such as an acoustic model based on a DNN, a Convolutional Neural Network (CNN), a Recurrent Neural Network (RNN), a Restricted Boltzmann Machine (RBM), or a Deep Belief Network (DBN). Although the acoustic model has been described as using the DNN for the convenience of description, the present invention is not limited thereto.

Figure 5:
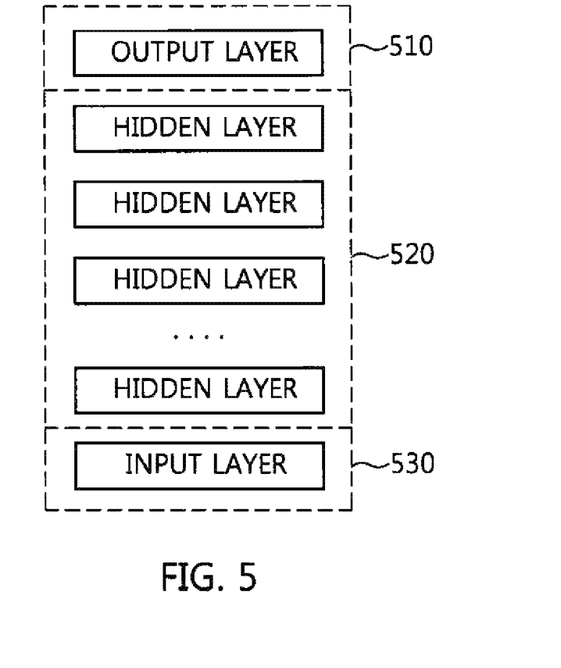
FIGS. 5 and 6 are diagrams showing the acoustic model of the voice recognition terminal.
Figure 6:
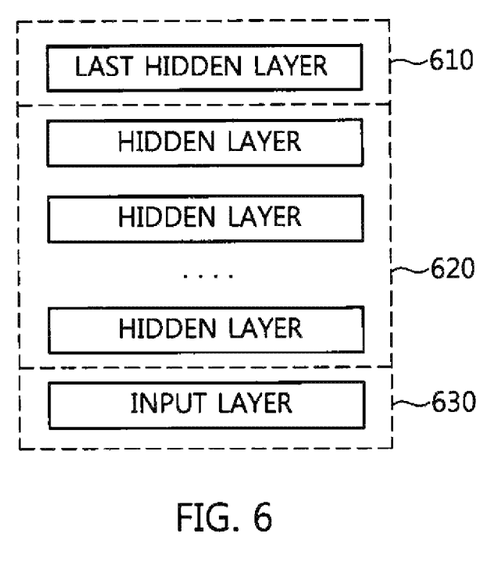

FIGS. 5 and 6 are diagrams showing the acoustic model of the voice recognition terminal.

As shown in FIG. 5, a DNN denotes an Artificial Neural Network (ANN) in which multiple hidden layers are present between an input layer and an output layer, and may be used to model complicated nonlinear relationships.

Further, in the DNN, until a current layer reaches the output layer after passing from the input layer through hidden layers, each of layers having different numbers of states produces a number of connections identical to the number obtained by multiplying the number of states of a previous layer by the number of states of a subsequent layer, with respect to the states of the subsequent layer. Furthermore, the acoustic model state scores to be transmitted from the voice recognition terminal 100 to the voice recognition server 200 are values occurring in the states of the final layer.

For example, it is assumed that an output layer used in a typical online service has 8,000 states. In this case, 8,000 floating point format (float type) states (4 bytes) must be transmitted to the voice recognition server 200 every 10 milliseconds, corresponding to an individual frame. That is, 3.2 Mbytes of data per second (8,000*4*100 bytes/sec) must be transmitted to the voice recognition server 200, which shows that the amount of data to be transmitted is very large, compared to the case of about 32 Kbytes of data per second (16,000*2 (short type) bytes/sec), which is typically required to transmit voice data at 16 KHz.

Therefore, the voice recognition terminal 100 according to the embodiment of the present invention may reduce the amount of data to be transmitted to the voice recognition server 200 by selecting the data to be transmitted to the voice recognition server 200.

First, the voice recognition terminal 100 may select only n-best candidates from among the calculated acoustic model scores.

The states of the output layer that are transcription values identical to actual acoustic data have fewer candidates, whereas the remaining states are less related to the acoustic data. Therefore, the voice recognition terminal 100 may transmit only state candidates having acoustically higher scores, among the state scores of the output layer, to the voice recognition server 200.

For example, among all of the states, when a group of candidates identical to the acoustic data for each frame is set to a group of highly ranked 200 state scores, the amount of data is 200*4*100 bytes/sec, and thus the voice recognition terminal 100 transmits about 80 Kbytes of data per second to the voice recognition server 200. Further, since the state scores do not fall outside of a predetermined range, the voice recognition terminal 100 may transmit about 40 Kbytes of data when the data is processed in a 2-byte fixed point format instead of a 4-byte floating point format.

At this time, since information identifying n-best states is required, the voice recognition terminal 100 transmits state binary information configured as an array, together with the state candidates, to the voice recognition server 200. For example, when there are 8,000 states, the voice recognition terminal 100 transmits 8,000 bits to the voice recognition server 200.

For the convenience of description, 41 Kbytes of data has been described as being transmitted per second, assuming 8,000 states and 200 n-best states, but the amount of data is not limited thereto, and the number of n-best states may be changed to 100 depending on the application, and thus 21 Kbytes of data, per second may also be transmitted.

Second, the voice recognition terminal 100 may select only acoustic model scores corresponding to the candidate information received from the voice recognition server 200 from among the calculated acoustic model scores.

The calculation for searching for an optimal path by the voice recognition server 200 is performed using a token-passing algorithm such as Viterbi. In this case, the voice recognition server 200 may request only scores corresponding to the required states from the voice recognition terminal 100 by transmitting the state information corresponding to a higher score token in the accumulated paths to the voice recognition terminal 100. Further, the voice recognition terminal 100 having received the request may transmit only the scores of states corresponding to the request to the voice recognition server 200.

When the n-best method is initially applied, and the number of states in the higher token becomes less than the number of n-best states, the voice recognition server 200 transmits a binary information array of the corresponding states to the voice recognition terminal 100. Further, the voice recognition terminal 100 transmits the scores of the corresponding states to the voice recognition server 200 using the received binary information array.

When only the acoustic model scores corresponding to the candidate information are transmitted to the voice recognition server 200 in this way, the amount of additional data may be variably reduced.

Third, the voice recognition terminal 100 may select n-best state scores of the last hidden layer from among the calculated acoustic model scores.

As shown in FIG. 6, the acoustic model of the voice recognition terminal 100 includes only hidden layers up to the last hidden layer, and the voice recognition server 200 may include a model corresponding to the final output layer. Further, the voice recognition server 200 may calculate acoustic model scores for up to the final output layer using the state values of the last hidden layer, which are transferred from the voice recognition terminal 100, and may ultimately acquire an acoustic model score value.

Since the method for transmitting n-best state scores of the last hidden layer to the voice recognition server 200 indicates the range in which the output layer is finally classified, it has a relatively large number of states. In contrast, hidden layers are portions in which abstract values are concentrated, and indicate a method for reducing the amount of data by utilizing the advantage of processing using a relatively small number of states.

For example, when the output layer is represented by 8,000 states, the last hidden layer may be configured using 1,500 states. Further, similar to the method of performing training using only n-best states of the hidden layers in a DNN training method, 10% of the states may be transmitted using the n-best, states of the last hidden layer even in voice recognition. At this time, based on the calculation of 150 states*2 bytes*100 bytes/sec, 30 Kbytes per second are required, and in addition, the transmission of a binary array of 1,500 bits (0.2 Kbytes) is required.

Although data has been described as being transmitted in units, of frames for the convenience of description, the transmission of data in the present invention is not limited thereto, and the voice recognition terminal 100 may reduce the frequency of transmission by transmitting data in units of clusters of frames to the voice recognition server 200 and may further reduce the amount of data to be transmitted using an additional compression technique.

Next, the voice recognition terminal 100 transmits acoustic model scores and state information to the voice recognition server 200 at step S340.

Here, the transmitted acoustic model scores may mean acoustic model scores selected by the voice recognition terminal 100 at, step S330. However, when the voice recognition terminal 100 according to the embodiment of the present invention omits the performance of step S330, the acoustic model scores may mean the acoustic model scores calculated at step S320.

Further, the voice recognition terminal 100 receives transcription data from the voice recognition server 200 and stores the transcription data at step S350.

Finally, the voice recognition terminal 100 may perform the adaptation of the acoustic model at step S360.

The voice recognition terminal 100 may implement personalized voice recognition by performing the adaptation of the acoustic model based on the transcription data, which is the result of voice recognition received from the voice recognition server 200.

The voice recognition terminal 100 according to the embodiment of the present invention is configured to implement voice recognition in which personalization is desirably reflected, without imposing the burden of the computation on the voice recognition server 200 and of additional memory, and may perform personalization by continuously reflecting, the acoustic characteristics of each user.

The voice recognition terminal 100 generates adaptation data by continuously accumulating both the feature data extracted from the voice signal and the transcription data received from the voice recognition server 200. Here, the voice recognition terminal 100 may perform adaptation using an unsupervised acoustic model.

Further, various DNN adaptation techniques may be utilized to reflect the characteristics of the acoustic model, and adaptation to speakers may be performed based on a fine-tuning method using the adaptation data in consideration of the performance that is realized when personalized data, which is continuously accumulated, is intermittently used.

At this time, when the acoustic model is given, as shown in FIG. 6, acoustic model adaptation is performed only on hidden layers up to the last hidden layer of the voice recognition terminal 100, and the acoustic model is then updated with a personalized acoustic model. Meanwhile, the output layer of the voice recognition server 200 maintains the state of a basic speaker-independent system.

Accordance with the present invention, there can be provided voice recognition technology, which reflects the personalized characteristics of respective speakers who have voice recognition terminals.

Further, the present invention can allow a voice recognition server to perform voice recognition that reflects personalized characteristics without having a separate DB or storage space for storing the personalized characteristics of speakers.

Furthermore, the present invention can protect the personal information of each user who has a voice recognition terminal because there is no need to transmit personal information, such as the voice data of the user, which is required to reflect personalized characteristics, to a server.

Furthermore, the present invention can effectively reduce the computational load on a voice recognition server because most calculations are performed using acoustic model scores that are stored in a voice recognition terminal.

As described above, in the voice recognition terminal, the voice recognition server, and the voice recognition method according to the present invention, the configurations and schemes in the above-described embodiments are not limitedly applied, and some or all of the above embodiments can be selectively combined and configured, whereby various modifications are possible.

What is claimed is:

1. A voice recognition terminal, comprising:
one or more units being configured and executed by a processor using an algorithm associated with least one non-transitory storage device, the one or more units comprising,
a feature extraction unit for extracting feature data from an input voice signal;
an acoustic score calculation unit for calculating acoustic model scores using the feature data;
a data selection unit for selecting acoustic model scores to be transmitted to a voice recognition server;
a communication unit for transmitting the acoustic model scores and state information to a voice recognition server in units of one or more frames, and receiving transcription data from the voice recognition server;
a storage unit for matching the extracted feature data with the transcription data received from the voice recognition server, and storing a result of matching as adaptation data; and
an acoustic model adaptation unit for performing adaptation of an acoustic model using the stored adaptation data, wherein
the adaptation of the acoustic model is performed by the processor based on the transcription data received from the voice recognition server in response to detection of a time corresponding to at least one of a preset time, a time during which the voice signal not being input, and a time during which communication with the voice recognition server is not performed, wherein
the transcription data is recognized using a calculated path of a language network when the voice recognition server calculates the path of the language network using the acoustic model scores, wherein
the data selection unit selects n-best state scores of a last hidden layer from among the calculated acoustic model scores, the last hidden layer being configured between an input layer and an output layer and multiple hidden layers being configured between the input layer and the output layer, and a number of states corresponding to the last hidden layer is less than a number of states corresponding to the output layer, wherein
the acoustic model of the voice recognition terminal includes hidden layers up to the last hidden layer, and the voice recognition server includes a model corresponding to a final output layer, and wherein
the voice recognition server calculate a final acoustic model score by applying only the n-best state scores of the last hidden layer received from the voice recognition terminal corresponding to the final output layer.

2. The voice recognition terminal of claim 1, wherein the data selection unit selects only n-best candidates from among the calculated acoustic model scores.

3. The voice recognition terminal of claim 1, wherein the data selection unit selects acoustic model scores corresponding to candidate information, received from the voice recognition server, from among the calculated acoustic model scores.

4. The voice recognition terminal of claim 1, wherein the acoustic model scores are represented in a fixed point format, and the state information is represented by a binary value.

5. A voice recognition server including a processor, the server comprising:
   a reception unit for receiving, from a voice recognition terminal that extracts feature data from a voice signal and calculates acoustic model scores, both state information and the acoustic model scores that are clustered into units of one or more frames;
   a voice recognition unit for generating transcription data by applying the received acoustic model scores to a large-capacity language network; and
   a transmission unit for transmitting the transcription data, generated as a result of voice recognition, to the voice recognition terminal, wherein
   the voice recognition unit calculates by the processor a final acoustic model score by applying n-best state scores of a last hidden layer, received from the voice recognition terminal, to a model corresponding to a final output layer, and, performs voice recognition using the calculated final acoustic model score,
   the last hidden layer being configured between an input layer and an output layer and a multiple hidden layers being configured between the input layer and the output layer, and a number of states corresponding to the last hidden layer is less than a number of states corresponding to the output layer, wherein
   the acoustic model of the voice recognition terminal includes hidden layers up to the last hidden layer, and the voice recognition server includes a model corresponding to a final output layer, and wherein
   the voice recognition server calculate a final acoustic model score by applying only the n-best state scores of the last hidden layer received from the voice recognition terminal corresponding to the final output layer.

6. A computer-implemented voice recognition method using a voice recognition terminal, comprising:
   extracting feature data from an input voice signal;
   calculating acoustic model scores using the extracted feature data;
   selecting acoustic model scores to be transmitted to the voice recognition server;
   transmitting the acoustic model scores and state information to a voice recognition server in units of one or more frames;
   matching the extracted feature data with the transcription data received from the voice recognition server, and storing a result of matching as adaptation data;
   performing adaptation of an acoustic model using the stored adaptation data, wherein
   the adaptation of the acoustic model is performed by the processor based on the transcription data received from the voice recognition server in response to detection of a time corresponding to at least one of a preset time, a time during which the voice signal not being input, and a time during which communication with the voice recognition server is not performed;
   selecting n-best state scores of a last hidden layers from among the calculated acoustic model scores, the last hidden layer being configured between an input layer and an output layer and a multiple hidden layers being configured between the input layer and the output layer, and a number of states corresponding to the last hidden layer is less than a number of states corresponding to the output layer; and
   receiving transcription data from the voice recognition server, wherein the transcription data is recognized using a calculated path of a language network when the voice recognition server calculates the path of the language network using the acoustic model scores, wherein
   the acoustic model of the voice recognition terminal includes hidden layers up to the last hidden layer, and the voice recognition server includes a model corresponding to a final output layer;
   calculating a final acoustic model score by applying only the n-best state scores of the last hidden layer received from the voice recognition terminal corresponding to the final output layer.

7. The voice recognition method of claim 6, wherein selecting the acoustic model scores comprises selecting acoustic model scores corresponding to candidate information, received from the voice recognition server from among the calculated acoustic model scores.

* * * * *